(12) United States Patent
Mannby

(10) Patent No.: US 10,891,033 B2
(45) Date of Patent: Jan. 12, 2021

(54) SYSTEM AND METHOD FOR ENHANCED TOUCH SELECTION OF CONTENT

(71) Applicant: Microsoft Technology Licensing, LLC, Redmond, WA (US)

(72) Inventor: Claes-Fredrik U. Mannby, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 16/112,002

(22) Filed: Aug. 24, 2018

(65) Prior Publication Data

US 2020/0064985 A1 Feb. 27, 2020

(51) Int. Cl.
*G06F 3/0484* (2013.01)
*G06F 3/0488* (2013.01)

(52) U.S. Cl.
CPC ........ *G06F 3/04842* (2013.01); *G06F 3/0488* (2013.01)

(58) Field of Classification Search
CPC .............. G06F 3/04842; G06F 3/0488; G06F 3/03545; G06F 2203/04105
See application file for complete search history.

(56) References Cited

U.S. PATENT DOCUMENTS

| | | | | |
|---|---|---|---|---|
| 8,760,438 B2* | 6/2014 | DiVerdi | ................ | G06F 3/0488 345/179 |
| 9,075,464 B2* | 7/2015 | Mankowski | ............ | G06F 3/041 |
| 9,116,612 B2* | 8/2015 | Rimas-Ribikauskas | ..................... | G06F 3/04842 |
| 9,201,520 B2* | 12/2015 | Benko | .................. | G06F 3/03545 |
| 9,727,161 B2* | 8/2017 | Hinckley | ............ | G06F 3/03545 |
| 2006/0132455 A1* | 6/2006 | Rimas-Ribikauskas | ..................... | G06F 3/0414 345/173 |
| 2006/0132456 A1* | 6/2006 | Anson | .................... | G06F 3/0488 345/173 |
| 2006/0132457 A1* | 6/2006 | Rimas-Ribikauskas | .................... | G06F 3/04842 345/173 |
| 2013/0120324 A1* | 5/2013 | DiVerdi | ................ | G06F 3/0488 345/179 |
| 2013/0257777 A1* | 10/2013 | Benko | .................. | G06F 3/03545 345/173 |
| 2014/0210730 A1* | 7/2014 | Mankowski | ............ | G06F 3/041 345/173 |
| 2015/0186005 A1* | 7/2015 | Roper | ................... | G06F 3/0488 715/765 |

(Continued)

*Primary Examiner* — Michael Pervan
(74) *Attorney, Agent, or Firm* — Fiala & Weaver P.L.L.C.

(57) ABSTRACT

Methods for enhancing touch selections for content are performed by systems and devices. Users apply a contact instrument such as a finger, stylus, or pen to a touch interface to select content displayed via a user interface. Different amounts of the content are selected based on the characteristics of the contact instrument application to the touch interface and displayed to the user. Additionally, selected portions of content can be expanded or reduced by altering the application of the contact instrument, such as changing pressure or orientation, and by receiving other selection modifying inputs from other input devices. Characteristics of interaction for contact instruments are determined and applied to selection commands by the systems and devices. Context information related to the content is also used in determining the scope of selections.

20 Claims, 6 Drawing Sheets

(56) References Cited

U.S. PATENT DOCUMENTS

2015/0363035 A1* 12/2015 Hinckley .............. G06F 3/0383
  345/173
2018/0046359 A1* 2/2018 Kim ...................... G06F 3/0414

* cited by examiner

SYSTEM AND METHOD FOR ENHANCED TOUCH SELECTION OF CONTENT

BACKGROUND

User interfaces such as touch interfaces allow users to select displayed content. For example, a user may tap a touch interface to place a cursor within text or to select an image or drawing. By holding a finger or stylus in one location of text, a word may be selected. If the user wishes to change the selection, the user may drag a selection indicator to cover more or less content. Users may also select content using a mouse or other input device. One such example is selecting a word by double-clicking a mouse button, or selecting a paragraph by triple-clicking the mouse button. In another example, the user may drag a cursor over content while holding the mouse button.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for enhancing touch selections for content are performed by systems, devices, and apparatuses. Users may apply a contact instrument such as a finger, stylus, or pen to a touch interface to select content displayed via a user interface. Different amounts of the content are selected based on the characteristics of the contact instrument application to the touch interface and displayed to the user. For example, different pressures applied and/or orientations of the contact instrument may cause different amounts of content to be selected. Additionally, selected portions of content can be expanded or reduced by altering the application of the contact instrument, such as changing pressure or orientation, and/or by receiving other selection modifying inputs from other input devices, physical and/or virtual. Characteristics of interaction by contact instruments are determined and applied to selection commands. Context information related to the content is also used in determining the scope of selections.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
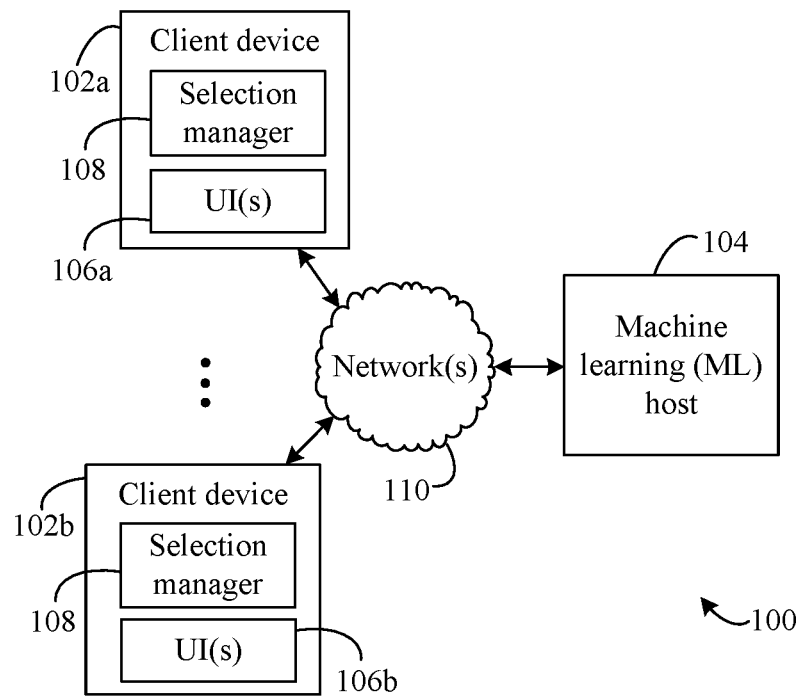
FIG. 1 shows a block diagram of a networked system for enhancing touch selections of content, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for enhancing touch selections for content. Section III below describes example mobile device and computing device embodiments that may be used to implement features of the embodiments described herein. Section IV below describes additional examples and advantages, and Section V provides some concluding remarks.

II. Example Embodiments for Enhancing Touch Selections for Content

Methods, systems, apparatuses, devices, and computer program products are provided herein for enhancing touch selections for content. Users may apply a contact instrument such as a finger, stylus, or pen to a touch interface such as a touch screen to select content displayed via a user interface. Based on the characteristics of the contact instrument application relative to the touch interface, different amounts or portions of the content are selected and displayed to the user. For example, different pressures applied for the contact instrument and different orientations of the contact instrument may each cause different amounts of content to be selected. Selected portions of content can be expanded or reduced by the user altering the application of the contact instrument, such as changing the pressure by increasing or decreasing it, and/or by the user changing the orientation of the contact instrument, such as angles of implementation and direction. Selections may also be changed by receiving other selection modifying inputs from other input devices. Characteristics of interactions for contact instruments are determined and applied to selection commands by the systems and devices through parameters, where the parameters may be generated according to the characteristics.

Context information related to the content may also be used in determining the scope of selections for the content. For instance, characters, words, names, phrases, grammatical portions of sentences such as subjects, predicates, prepositions, etc., sentences, paragraphs, and/or the like, may be selected based on the content being text and/or recognition of these portions of the content.

Content may be any type of selectable displayed object including, without limitation, typed characters, handwritten characters, images, photographs, diagrams, cells in a grid, audio data, video data, virtual environment/3-D constructs, relationship graphs, and/or the like.

In other words, the embodiments disclosed herein provide enhanced touch selections for content. These and further embodiments are described in greater detail as follows.

Systems and devices may be configured in various ways for enhancing touch selections for content. For instance, FIG. 1 is a block diagram of a computing system 100 ("system 100" hereinafter), according to embodiments. System 100 is configured to enable enhanced touch selections for content, according to embodiments. As shown in FIG. 1, system 100 includes a client device 102a, a client device 102b, and a machine learning host 104, which may communicate with each other over a network 110. It should be noted that any numbers of client devices and/or ML hosts may be present in various embodiments. Additionally, any combination of the components illustrated in FIG. 1 may be present in system 100, according to embodiments.

As noted above, client device 102a, client device 102b, and ML host 104 are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

ML host 104 may comprise one or more server computers or computing devices, which may include one or more distributed or "cloud-based" servers. In embodiments, ML host 104 may be associated with, or may be a part of, a cloud-based service platform such as Microsoft® Azure® from Microsoft Corporation of Redmond, Wash. Client devices such as client device 102a and/or client device 102b may be configured to provide information associated with selections to ML host 104 via network 110. ML host 104 may be configured to train/re-train selection models using machine learning techniques and based on selection information received from client devices. In embodiments, neural networks may be implemented by ML host 104 to update models.

For instance, if a user selects a portion content as described herein in a first selection, but then does not perform an action on the selected content and instead reselects a different portion of content with a second selection to perform an action, the information associated with the first and second selections may be provided to ML host 104 to improve selection models. In other words, ML host 104 may utilize selection attempts of users that do not result in the desired portion of content being selected and compare, via machine learning algorithms, those results to selection attempts in which the desired portion of content is selected to refine selection models. Such refined models may be provided from ML host 104 to client device 102a and/or client device 102b via network 110 for implementation.

It should be noted that as described herein, embodiments of ML host 104 are applicable to any type of system where a system for machine learning communicates with client devices over a network. One example noted above is where ML host 104 is a "cloud" implementation, application, or service in a network architecture/platform. A cloud platform may include a networked set of computing resources, including servers, routers, etc., that are configurable, shareable, provide data security, and are accessible over a network such as the Internet. Cloud applications/services such as for machine learning may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Client device 102a and/or client device 102b may be any type of computing device or computing system, including a terminal, a personal computer, a laptop computer, a tablet device, a smart phone, a personal digital assistant, a game console or gaming device, a television, and/or the like that may be utilized by users through interaction with contact instruments to select content displayed via a user interface, e.g., on a display. In embodiments, client device 102a and/or client device 102b may each comprise a touch interface, e.g., a touch screen or touch pad, or may have a peripheral touch interface associated therewith for interaction via contact devices.

Client devices described herein may be configured to execute software applications that cause content to be displayed to users via UIs, e.g., UI(s) 106a of client device 102a and/or UI(s) 106b of client device 102b. Such software applications may also enable users to provide selection indicia for content via touch interfaces as described above. That is, a user may select displayed content using a contact instrument such as a finger(s), a light pen, a stylus, etc., according to the embodiments herein.

As illustrated, client device 102a and/or client device 102b may include an instance of a selection manager 108. Selection manager 108 may be a part of a client device operating system (OS) or an application installed at the client device, may be an application itself, etc., in various embodiments. Selection manager 108 is configured to perform operations for enhancing touch selections for content, as described in further detail below. For example, when a user applies a contact instrument to a touch interface to select displayed content, selection manager 108 is configured to receive the input and determine characterization information of the contact instrument. As noted above, different amounts of the content may be selected based on the characteristics of the contact instrument applied to a touch interface. Selection manager 108 may be configured to determine different pressures applied and/or orientations of the contact instrument in the initial application thereof, as well as subsequent changes in the interaction characteristics for modifying the selection of the content portion. It should also be noted, however, that characteristics other than pressure and orientation are contemplated herein, including but without limitation, contact location/position, a virtual contact location such as in a 3-D or virtual environment, a number of fingers or orientation of fingers or position of fingers with respect to a camera or kinetic sensor, etc. For instance, characteristics such as finger positions, orientations, and/or configurations may be detected by a camera or other kinetic sensor(s). Changes to such characteristics may indicate information for changing selections, e.g., scalar values or other ranges of choices (e.g., small, medium, large portions) to increase or decrease portions of selected content. Likewise, a configuration of pinched fingers may traverse a real 3-D or virtual space to indicate portions for selection as described herein. Accordingly, when pressure/orientation are described herein for illustrated embodiments, such characteristics are not to be considered limiting, and other characteristics may be applied for such embodiments. Selection manager 108 may be configured to generate parameters for selection commands based on the determined characteristics to affect content selection. Execution of these commands causes the content to be displayed as selected or highlighted to the user via a UI.

Selection manager 108 may be implemented in hardware, hardware combined with one or both of software and/or firmware, and/or as program instructions encoded on computer-readable storage media, and may be configured to perform any functions and/or operations described herein for enhancing/enabling touch selections for content.

Figure 2:
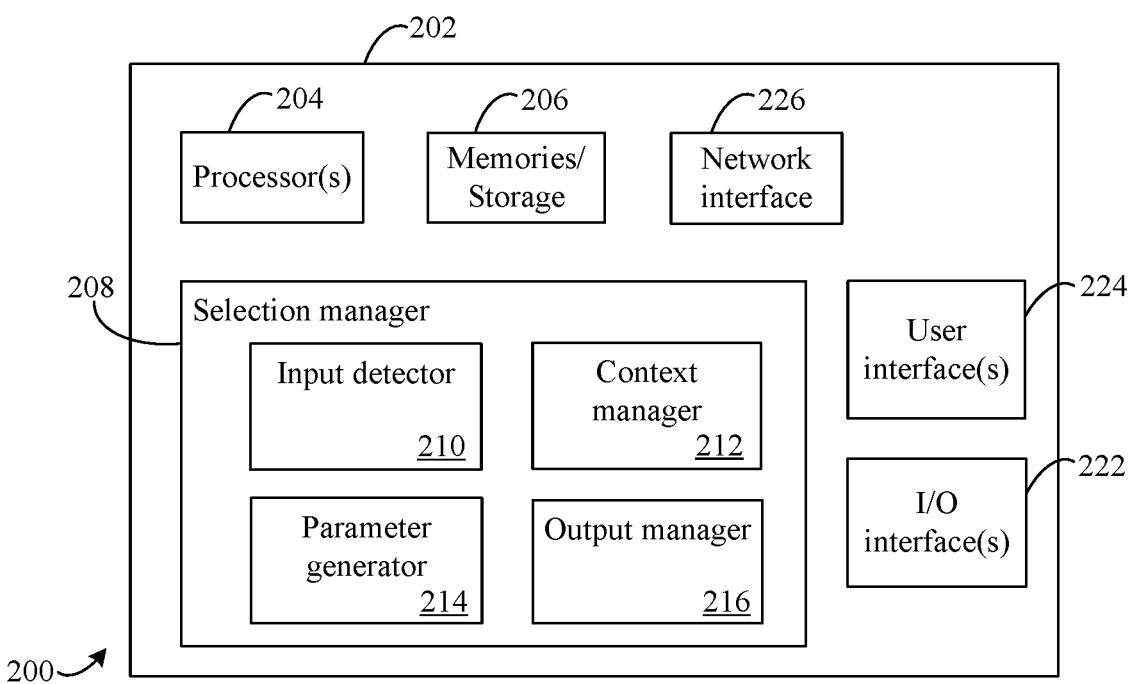
FIG. 2 shows a block diagram of a computing system for enhancing touch selections of content, according to an example embodiment.

Accordingly, a client device, such as client device 102a and/or client device 102b, may be configured in various ways for improvements and enhancements in touch selections for content. For example, FIG. 2 is a block diagram of a client system 200 ("system 200" herein) configured for such improvements and enhancements. System 200 is an embodiment of queuing system 100 of FIG. 1, e.g., client device 102a and/or client device 102b. System 200 is described as follows.

System 200 includes a computing device 202, which may be an embodiment of client device 102a and/or client device 102b of FIG. 1, and may be any type of computer or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 226, and a selection manager 208 that may be an embodiment of session selection manager 108 of FIG. 1. System 200 may also include an input/output interface(s) 222, and a user interface(s) (UI(s)) 224 which may be an embodiment of UI(s) 106 of FIG. 1 described above. System 200 may also include additional components (not shown for brevity and illustrative clarity) including, but not limited to, components and subcomponents of other devices and/or systems herein, as well as those described below with respect to FIGS. 10 and 11, such as an operating system.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of selection manager 208, which may be implemented as computer program instructions for enhancement touch selections for content, etc., as described herein. Memory 206 is configured to store such computer program instructions/code, as well as to store other information and data described in this disclosure including, without limitation, orientation and/or pressure information, content selections, etc.

Network interface 226 may be any type or number of wired and/or wireless network adapter, modem, etc., configured to enable system 200 to communicate with other devices over a network, such as communications between system 200 and other devices utilized in a network as described herein (e.g., client device 102a, client device 102b, and/or ML host 104) over a network such as network 110 as described above with respect to FIG. 1.

I/O interface(s) 222 may comprise hardware and/or software and may support any number of input devices and instruments such as a stylus, a light pen, a mouse, a touch screen, a touch pad, a microphone, a camera, a kinetic sensor, a physical keyboard, a trackball, virtual reality eyewear, gloves, other wearables or sensors, etc., and/or the like, and one or more output devices such as a speaker, a display screen, and/or the like. Devices such as touch screens and touch pads may support human touch (e.g., with a finger or other body part as the instrument). In embodiments, an I/O interface may comprise both input and output portions, e.g., a touchscreen, a headset, smart glasses, etc. Additional I/O devices supported by I/O interface(s) 222 are described below with respect to FIGS. 10 and 11.

UI(s) 224 may include, without limitation, any type of software or hardware UI implementation. UI(s) 224 may be, for example, user interfaces displayed to users via output devices described herein that may be interacted with via input devices described herein. UI(s) 224 may comprise portions of any types of software applications, such as but not limited to, an OS, web browsers, productivity software, electronic mail applications, audio applications, video applications, audio/video applications, 3-D software/virtual environments, drawing software, etc. UI(s) 224 may display content or representations thereof, as described herein, such as any type of selectable object including, without limitation, typed characters, handwritten characters, images, photographs, diagrams, cells in a grid, audio data, video data, virtual environment/3-D constructs, graphs, and/or the like.

Selection manager 208 includes a plurality of components for performing the functions and operations described herein for improvements in touch selections for content. As shown, selection manager 208 includes an input detector 210, a context manager 212, a parameter generator 214, and an output manager 216. While shown separately for illustrative clarity, in embodiments, one or more of input detector 210, context manager 212, parameter generator 214, and/or output manager 216, may be combined together and/or as a part of other components of system 200. In some embodiments, less than all of the components of selection manager 208 illustrated in FIG. 2 may be included. In software implementations, one or more components of selection manager 208 may be stored in memory 206 and are executed by processor 204.

Input detector 210 may be configured to receive inputs from one or more input interfaces of I/O interface(s) 222. In embodiments, the inputs are generated by interaction with contact instruments via a touch interface. For instance, a stylus, light pen, user finger, and/or the like may interact with a touchscreen, touchpad, etc. to generate the inputs. Input detector 210 may be configured to determine characterization information or characteristics of the contact instrument interaction with the touch interface, and to identify commands for selection of content that are associated with the input.

Context manager 212 may be configured to receive and/or determine context information related to content of which a user selects a portion thereof through interactions with I/O interface(s) 222 and/or UI(s) 224. Context information may be based, without limitation, on one or more of semantics of the content, a type of application related to the content, a type of object in the content, a delimiter in the content, etc. In some embodiments, context manager 212 may store one or more default context options. For instance, if an application for which a user applies a contact instrument to one of I/O interface(s) 222 is associated with the entry of text, this may be the default context option for such an application. In this example, a default "text" option for context may correspond to selecting a character of the text at a predetermined initial or a finest level of granularity and proceed through selecting words, phrases, sentences, paragraphs, etc., as the scope of a selection increases as described herein. In embodiments, the levels of granularity may be cycled through in one or more iterations such that the finest scope selection is provided after the broadest scope selection.

Parameter generator 214 may be configured to generate or re-generate parameters for selection commands. For example, selection commands that correspond to user interaction with I/O interface(s) through input devices may include one or parameters that designate the amount of content selected via the command. Parameters may be generated/re-generate based on information associated with the user interactions, e.g., characterization information related to contact instruments.

Output manager 216 may be configured to cause selection commands to be executed with the parameter received from parameter generator 214. Output manager 216 may also be configured to provide outputs to UIs of UI(s) 224 that indicate portions of the content selected by users through interaction of contact instruments with I/O interface(s) 222.

Accordingly, selection manager 208 may operate in various ways to enable improvements in touch selections for content. Additional details regarding selection manager 208 and its components are provided below.

Figure 3:
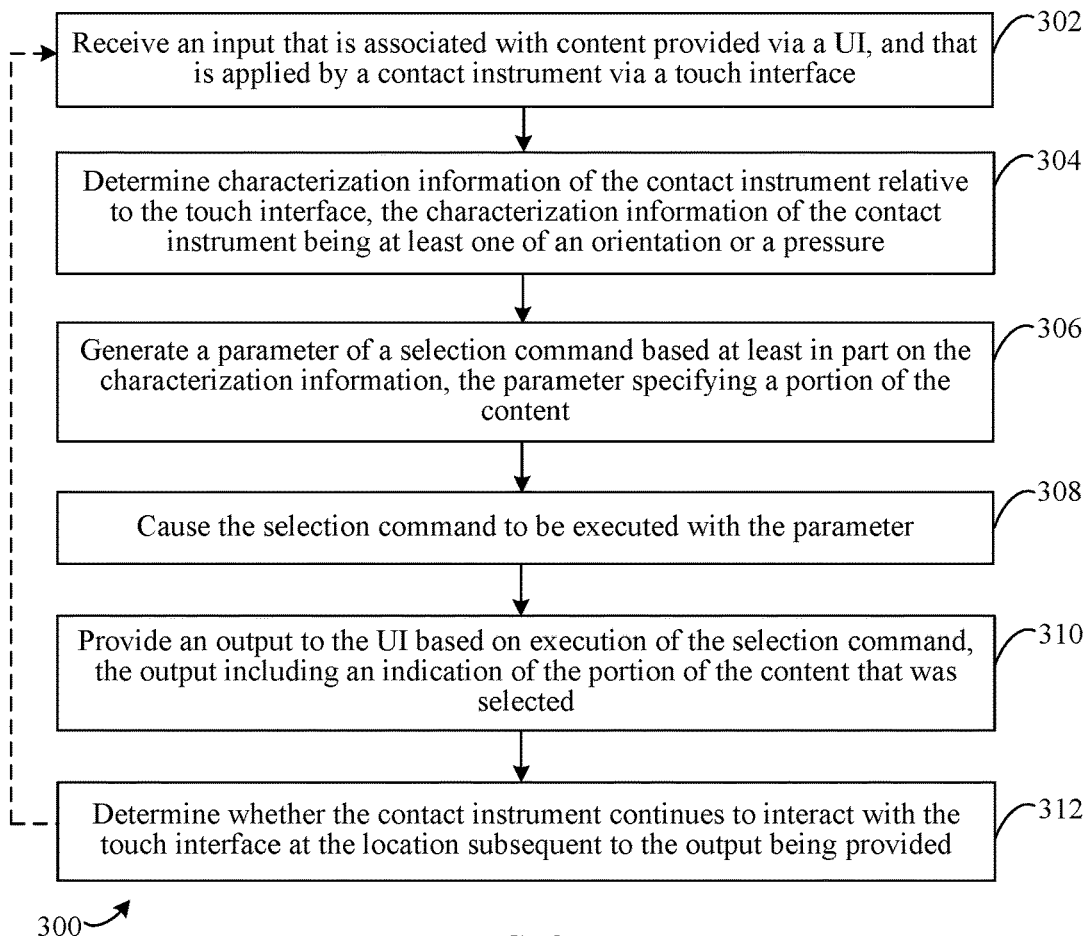
FIG. 3 shows a flowchart for touch selections for content, in accordance with an example embodiment.

For instance, FIG. 3 shows a flowchart 300 for improvements in touch selections for content, according to an example embodiment. Selection manager 208 may operate according to flowchart 300, in an embodiment. Further structural and operational examples will be apparent to persons skilled in the relevant art(s) based on the following description. Flowchart 300 is described as follows with respect to system 100 of FIG. 1 and system 200 of FIG. 2.

Flowchart 300 begins at step 302. In step 302, an input is received that is associated with content provided via a UI, and that is applied by a contact instrument via a touch interface. For example, input detector 210 may be configured to receive inputs from one or more input interfaces of I/O interface(s) 222. Inputs may be associated with content of software and/or software applications displayed via UI(s) 224. In embodiments, the inputs are generated by interaction with contact instruments via a touch interface of I/O interface(s) 222. For instance, a stylus, a light pen, a user's finger, and/or the like may interact with a touchscreen, touchpad, etc. to generate the inputs. As an example, a user may apply a contact instrument to a touch interface in a position that corresponds to content in a UI, e.g., text, the user desires to select. In a touch display embodiment, the received input may have the form of an indication of the screen pixels of the touch display contacted by the contact instrument. Input connector 210 may be configured to output contact data that indicates the contact screen region (e.g., pixel values, rasterized data, etc.).

In step 304, characterization information of the contact instrument relative to the touch interface is determined, where the characterization information of the contact instrument is at least one of an orientation or a pressure. For instance, input detector 210 may be configured to determine characterization information or characteristics of the contact instrument interaction with the touch interface, such as but not limited to, pressure of application of the contact instrument to the touch interface, orientation of the contact instrument with respect to the touch interface, and/or the like. In embodiments, the characterization information includes a location of the interaction with respect to the touch interface. In an embodiment, a display screen or other touch interface may include an array of piezoelectric sensors that record pressure (e.g., pixel-by-pixel) at their locations. Additional or alternatively, the larger the contact area on the display screen, the higher the pressure. Conversely, the smaller the contact area on the display screen, the lower the pressure. Furthermore, a shape of a contact area on the display screen (e.g., in pixels) may be indicative of an orientation of the contact instrument. For instance, the closer the shape of the contact area is to round, the more upright the contact instrument is oriented (e.g., closer to orthogonal to the display screen). The more oval or elliptical the shape of the contact area, the less upright the contact instrument is oriented (e.g., shifting from orthogonal to the display screen, to closer to oriented parallel to the display screen). Thus, the longitudinal angle of orientation for the contact instrument may be determined. Still further, the long (or short) axis of a non-circular contact area may traverse a portion of a display screen in different directions based on the directionality of the touch instrument. Thus, the azimuthal angle of orientation for the contact instrument may be determined.

In step 306, a parameter of a selection command is generated based at least in part on the characterization information, the parameter specifying a portion of the content. For example, parameter generator 214 may be configured to generate a parameter for a selection command associated with the interaction. Parameter generator 214 may receive characterization information from input detector 210 and utilize this information to generate parameters for selection commands. In embodiments, selection commands that correspond to user interaction with I/O interface(s) 222 through input devices such as contact instruments may include one or parameters that designate the amount of content selected via the command. These parameters may be generated, or re-generated, based on information associated with the interactions, e.g., characterization information related to contact instruments. As an example, an amount of pressure or an orientation of the contact instrument may indicate a certain amount of content to be selected.

In step 308, the selection command is caused to be executed with the parameter. For instance, output manager 216 may be configured to cause selection commands to be executed with the parameter received from parameter generator 214 as generated in step 306. In embodiments, this includes executing the commands by output manager 216. When parameters are determined by parameter generator 214, output manager may receive the parameters for the selection command. The execution of the selection command is performed in accordance with the parameter to determine the size or portion of content selected by the command.

In step 310, an output is provided to the UI based on execution of the selection command, the output including an indication of the portion of the content that was selected. For example, output manager 216 may also be configured to provide outputs to UIs of UI(s) 224 that indicate portions of the content selected by users through interaction of contact instruments with I/O interface(s) 222. Portions of content may be indicated as being selected by highlighting, underlining, and/or altering the content to bring it to the attention of the user. Indications may also include other types of visual cues, or auditory/haptic cues, as indicia of selection for content portions. As an example, an interaction of a stylus, pen, or, finger having a certain orientation and/or pressure, with a touch interface may cause a word of text at the interaction location to be highlighted as selected for viewing or further actions by the user.

In step 312, it is determined whether the contact instrument continues to interact with the touch interface at the location subsequent to the output being provided. For instance, input detector 210 may be configured to determine if the contact instrument remains touching the touch interface at the location after the selected portion of content is presented to the user (as in step 310). Continuing with the example above, if a word of text is displayed to the user as being selected, and the contact instrument is not moved from its initial location, input detector 210 determines that the contact instrument continues to interact with the touch interface at the location.

In embodiments, this continued interaction may indicate that the user desires to change the portion of content selected by the executed selection command. In such cases, the continued interaction determined in step 312 may cause flowchart 300 to return to step 304 and iterate from step 304 to step 312 as described above but determining different characterization information in step 304 (e.g., the user changes the pressure or orientation of the contact instrument) and re-generating the parameter as a different parameter in step 306 based on the determined change in the characterization information for iterations.

After an output showing a selected portion of content is provided to the user, the user may remove the contact instrument from interaction with the touch interface. In embodiments, the selected portion of content may still be shown via a UI of UI(s) 224 enabling the user to take further action on the selected portion.

By varying selection of portions of content based on characteristics of contact instrument interaction with touch interfaces, the granularity of selection options for UI and I/O interfaces is significantly increased while still allowing for portions of varying sizes to be selected.

Figure 4:
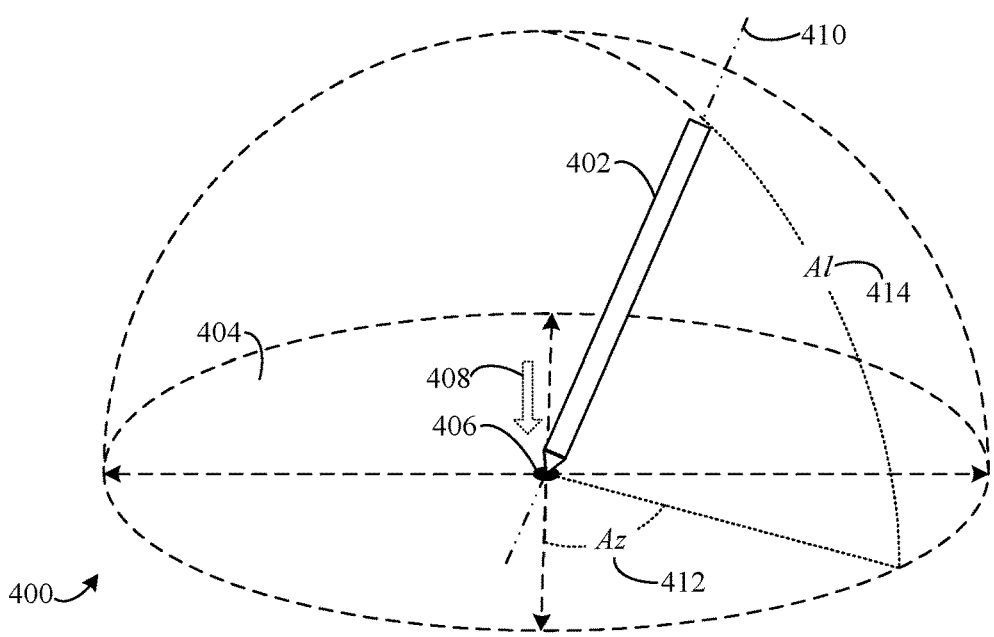
FIG. 4 shows a diagram of characteristics of an example contact instrument for enhancing touch selections for content, in accordance with an embodiment.

For instance, FIG. 4 shows a diagram for characteristics 400 for improvements in touch selections for content, according to an example embodiment. Characteristics 400 are described with respect to a stylus 402 being used by a user and that is interacting with a touch screen 404. As shown for characteristics 400, stylus 402 may interact with touch screen 404 at a location 406. In embodiments, location 406 may correspond to content displayed by touch screen 404, e.g., content of a software application being utilized by the user, and a location such as location 406 may also be a characteristic of an interaction. While characteristics 400 are described with respect to a stylus 402 interacting with a touch screen 404 for illustrative purposes, any other type of contact instrument and/or touch interface are also contemplated herein.

Interactions may include a pressure 408 (or force) applied to touch screen 404 by the user via stylus 402. Pressure 408 may vary in a way corresponding to different portions of content the user desires to select. For instance, a user may press harder with more pressure 408 through stylus 402 on touch screen 404 to select a larger portion of content, or conversely, may apply less pressure 408 to select a smaller portion of the content. These interactions through pressures applied, and changes thereof, described here may be determined and/or identified by input detector 210 of system 200 in FIG. 2.

Also illustrated for characteristics 400 is an orientation of stylus 402 along an axis 410 with respect to touch screen 404. Axis 410 runs along the length of stylus 402 and through location 406. Axis 410 may be further defined by an azimuth angle (Az) 412 and a longitudinal angle (Al) 414. It should be noted that the reference point shown for determining the values of Az 412 and Al 414 with respect to touch screen 404 are illustrative only, and are not to be considered limiting. Any reference point of touch screen 404 may be used for determining orientations, according to embodiments.

Orientations may be changed by altering one or more of Az 412 and Al 414 though interactions of stylus 402. In embodiments, a given orientation of stylus 402, e.g., a smaller value of Al, may cause more or less of the contacting portion thereof to interact with touch screen 404. Similarly, changes in Az may cause the contacting portion of stylus 402 to interact with a different area of touch screen 404. These differences in interactions through orientations, or changes thereof, described herein may be determined and/or identified by input detector 210 of system 200 in FIG. 2.

Figure 5A:
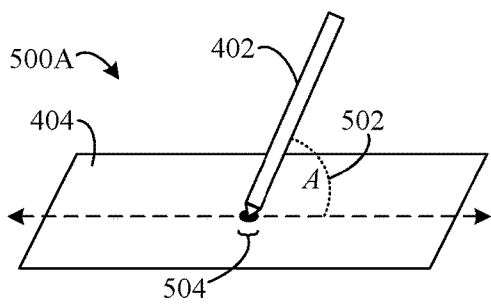
FIGS. 5A-5C show diagrams of orientation characteristics of the contact instrument of FIG. 4 for enhancing touch selections for content, in accordance with an example embodiment.
Figure 5B:
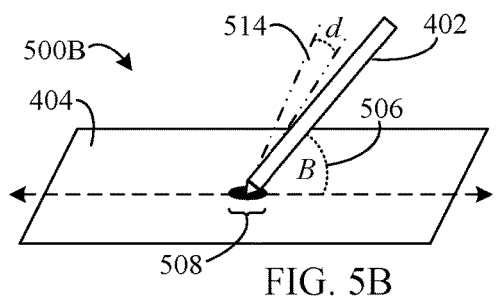
Figure 5C:
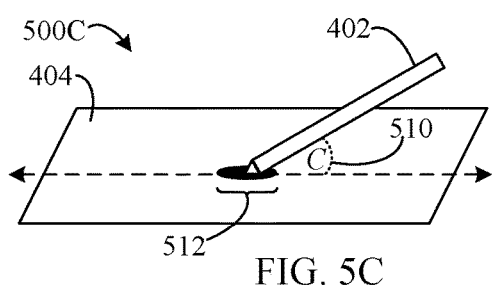

For instance, FIGS. 5A-5C and FIGS. 6A-6C will now be described with reference to FIG. 4. FIGS. 5A-5C show diagrams of orientations 500A-500C, respectively, of the contact instrument of FIG. 4 for enhancing touch selections for content, in accordance with an example embodiment. For orientations 500A-500C in FIGS. 5A-5C, stylus 402 and touch screen 404 of FIG. 4 are again depicted. Orientations 500A-500C may each be an embodiment of characteristics 400.

Orientations 500A-500C illustrate three example orientations of stylus 402 with respect to touch screen 404: orientation 500A, orientation 500B, and orientation 500C. In orientation 500A, stylus 402 is held at an angle A 502 above the plane of touch screen 404. At angle A 502, stylus 402 creates a contact point 504 with touch screen 404 having a first size and shape that corresponds to angle A 502. That is, the point of stylus 402, when held at different angles, causes different sizes and shapes of contact therewith to touch screen 404 (e.g., like a finger press that is straight down on a surface leaves a smaller, more circular print than a finger press done at an angle). As shown in orientation 500A, a relatively larger angle, such as angle A 502, may cause a relatively smaller and rounder contact point 504.

In orientation 500B, stylus 402 is held at an angle B 506 above the plane of touch screen 404. At angle B 506, stylus 402 creates a contact point 508 with touch screen 404 having a second size and shape that corresponds to angle B 506. As shown in orientation 500B, angle B 506 is a relatively smaller angle than angle A 502, and may cause a relatively larger and less round (e.g., more elliptical) contact point 508.

In orientation 500C, stylus 402 is held at an angle C 510 above the plane of touch screen 404. At angle C 510, stylus 402 creates a contact point 512 with touch screen 404 having a third size and shape that corresponds to angle C 510. As shown in orientation 500C, angle C 510 is a relatively smaller angle than angle B 506, and may cause a relatively larger and less round (e.g., even more elliptical) contact point 512 than contact point 508. Accordingly, angle A 502 (FIG. 5A) is the closest of angles A-C of FIGS. 5A-5C to orthogonal, or a right angle, to touch screen 404. Angle C of FIG. 5C is closest to parallel to touch screen 404 of angles A-C of FIGS. 5A-5C.

As noted above, the respective sizes and shapes of contact point 504, contact point 508, and contact point 512 may be determined and/or identified by input detector 210 of system 200 in FIG. 2 to perform embodiments described herein.

For example, the size/shape of the contact point created by stylus 402 as applied to touch screen 404 may correspond to a size of a portion of content to be selected. An initial interaction according to orientation 500A may cause a first iteration of flowchart 300 to be performed. After the output is provided in step 310, it may be determined in step 312 that interaction of stylus 402 with touch screen 404 continues. Additionally, the user may change stylus 402 from orientation 500A to orientation 500B. As described above, orientation 500B has a second size and shape that is different from orientation 500A. In this example, flowchart 300 may reiterate step 302 through step 312 according to the new orientation (i.e., orientation 500B) to alter the portion of content selected. In embodiments, a change from the first size and shape of contact point 504 to the second size and shape of contact point 508 may indicate a desired change in the portion of content selected (e.g., more or less content to be selected).

Continuing this example, flowchart 300 may again reiterate step 302 through step 312 according to a new orientation (i.e., orientation 500C) to alter the portion of content selected. That is, the user may again change stylus 402 from orientation 500B to orientation 500C after the second output of reiterated step 310 as determined in reiterated step 312. A change from the second size and shape of contact point 508 to the third size and shape of contact point 512 may indicate another desired change in the portion of content selected (e.g., more or less content to be selected).

It is contemplated that any of orientation 500A, orientation 500B, and/or orientation 500C may represent the initial interaction of stylus 402 with touch screen 404, as similarly described above in step 302 of flowchart 300 in FIG. 3. For example, an initial orientation according to orientation 500B (FIG. 5B) may be altered to either of orientation 500A (FIG. 5A) or orientation 500C (FIG. 5C) to select more or less (or less or more) content for a desired, selected portion.

Also illustrated in FIG. 5B is an angle d 514. Angle d 514 corresponds to a threshold change or hysteretic limit that may be required in embodiments for a change in an orientation to be recognized. That is, a change in the angle by which stylus 402 is applied to touch screen 404 may not be considered as a change in orientation unless the angle changes by a certain amount as represented by angle d 514.

Additionally, while a longitudinal angle (e.g., as shown for Al 414 of FIG. 4) is illustrated in the description of FIGS. 5A-5C, changes in azimuth may also correspond to orientation changes, and thus changes in portions of content selected, according to embodiments. That is, changes in azimuth for interactions may cause the contact point for the touch instrument to be oriented differently with respect to the touch interface.

Figure 6A:
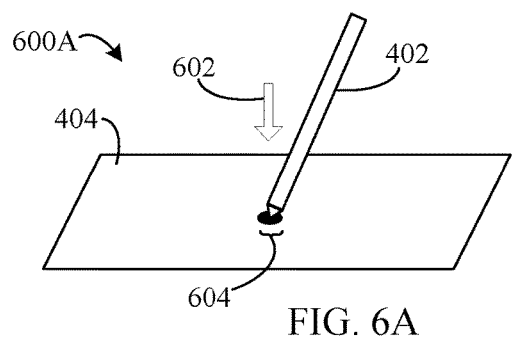
FIGS. 6A-6C show diagrams of pressure characteristics of the contact instrument of FIG. 4 for enhancing touch selections for content, in accordance with an example embodiment.
Figure 6B:
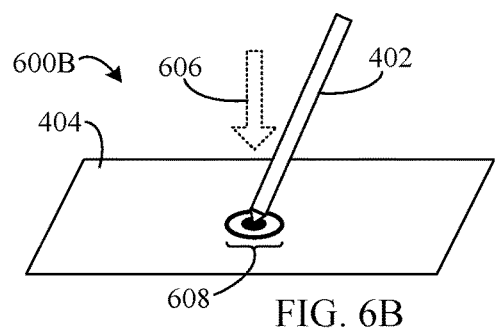
Figure 6C:
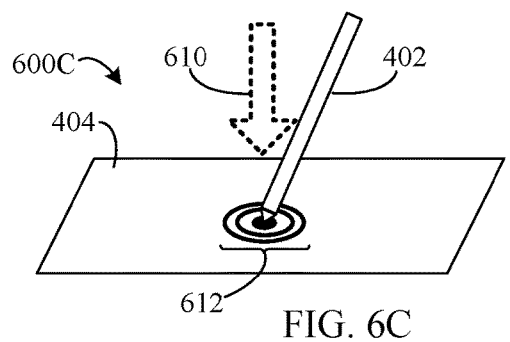

FIGS. 6A-6C show diagrams of pressure applications 600A-600C, respectively, of the contact instrument of FIG. 4 for enhancing touch selections for content, in accordance with an example embodiment. For pressure applications 600A-600C in FIGS. 6A-6C, stylus 402 and touch screen 404 of FIG. 4 are again depicted. Pressure applications 600A-600C may each be an embodiment of characteristics 400.

Pressure applications 600A-600C illustrate three example pressure applications of stylus 402 with respect to touch screen 404: pressure application 600A, pressure application 600B, and pressure application 600C. In pressure application 600A, stylus 402 is applied with a force or pressure 602 to touch screen 404. At pressure 602, stylus 402 creates an impact pressure point 604 with touch screen 404 having a first impact pressure that corresponds to pressure 602. That is, the point of stylus 402, when applied with different pressures or force, causes different impact pressures for contact with touch screen 404. As shown in pressure application 600A, a relatively small pressure, such as pressure 602, may cause a relatively smaller impact pressure point 604.

In pressure application 600B, stylus 402 is applied with a force or pressure 606 to touch screen 404. At pressure 606, stylus 402 creates an impact pressure point 608 with touch screen 404 having a second impact pressure that corresponds to pressure 606. As shown in pressure application 600B, a relatively larger pressure, such as pressure 606, may cause a relatively larger impact pressure point 608 than impact pressure point 604.

In pressure application 600C, stylus 402 is applied with a force or pressure 610 to touch screen 404. At pressure 610, stylus 402 creates an impact pressure point 612 with touch screen 404 having a third impact pressure that corresponds to pressure 610. As shown in pressure application 600C, pressure 610 is a relatively larger pressure/force than pressure 606, and may cause a relatively larger impact pressure point 612 than impact pressure point 608.

As noted above, the respective pressures at impact pressure point 604, impact pressure point 608, and impact pressure point 612 may be determined and/or identified by input detector 210 of system 200 in FIG. 2 to perform embodiments described herein.

For example, the pressure or force of the impact pressure point created by stylus 402 as applied to touch screen 404 may correspond to a size of a portion of content to be selected. An initial interaction according to pressure application 600A may cause a first iteration of flowchart 300 to be performed. After the output is provided in step 310, it may be determined in step 312 that interaction of stylus 402 with touch screen 404 continues. Additionally, the user may change stylus 402 from pressure application 600A to pressure application 600B. As described above, pressure application 600B has a second pressure/force that is different from pressure application 600A. In this example, flowchart 300 may reiterate step 302 through step 312 according to the new pressure application (i.e., pressure application 600B) to alter the portion of content selected. In embodiments, a change from the first pressure/force of impact pressure point 604 to the second pressure/force of impact pressure point 508 may indicate a desired change in the portion of content selected (e.g., more or less content to be selected).

It is contemplated that any of pressure application 600A, pressure application 600B, and/or pressure application 600C may represent the initial interaction of stylus 402 with touch screen 404, as similarly described above in step 302 of flowchart 300 in FIG. 3. For example, an initial pressure application according to pressure application 600B may be altered to either of pressure application 600A or pressure application 600C to select more or less (or less or more) content for a desired, selected portion.

It is also contemplated herein that multiple characteristics and characteristic information for the interaction of a touch instrument with a touch interface may be concurrently applied and/or changed. For example, both orientation and pressure as illustrated in FIGS. 5A-5C and FIGS. 6A-6C, respectively, may be determined and/or identified by input detector 210 of system 200 in FIG. 2 for a single interaction. Furthermore, changes to both orientation and pressure may be utilized to alter the amount of portions of content selected. Still further, the contact point of the contact instrument may be changed to affect additional selections of portions of content. For instance, as an illustrative and non-limiting example, an initial interaction according to orientation 500A which is then changed to orientation 500B may cause a word portion of content to be selected. Holding the contact instrument such as stylus 402 at orientation 500B after selection of the word, while dragging stylus 402 across touch screen 404 to alter the contact point of stylus 402 may cause additional word portions of the contact to be selected as the contact point continues to change. That is, word-level extensions to the selection may be applied, adding portions of selected content word-by-word as the contact point traverses words in the content. Embodiments herein may also be similarly applied according to pressures and altered contact points, and may also be similarly applied to different scopes of content portions (e.g., characters, phrases, sentences, paragraphs, etc.).

Figure 7:
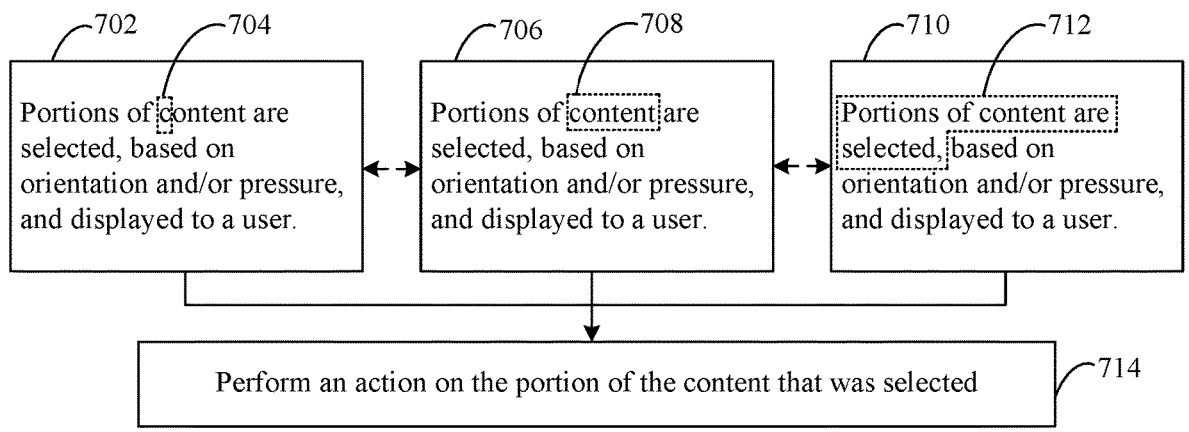
FIG. 7 shows a flow diagram for enhancing touch selections for content, in accordance with an example embodiment.

Turning now to FIG. 7, a flow diagram 700 for improvements in touch selections for content is shown, according to an example embodiment. Flow diagram 700 may be a further embodiment of flowchart 300 of FIG. 3, and one or more of orientations 500A-5C of FIGS. 5A-5C or pressure applications 600A-600C of FIGS. 6A-6C. Flow diagram 700 is described as follows.

In step 702, an initial interaction of a contact instrument with a touch interface is performed and detected. In the illustrated example, the initial interaction may correspond to orientation 500A of FIG. 5A and/or pressure application 600A of FIG. 6A. This initial interaction may cause a portion 704 of content displayed to a user to be selected. As shown, the letter 'c' of the word "content" is selected. In embodiments, this selection may be performed according to flowchart 300 of FIG. 3.

Subsequent to the selection in step 702 of portion 704 of the displayed content, it may be determined that the contact instrument continues to interact with the touch interface. In this example, a user may alter the interaction of the contact instrument from orientation 500A to orientation 500B of FIG. 5B and/or from pressure application 600A to pressure application 600B of FIG. 6B.

Accordingly, in step 706, the change in the interaction may cause a different portion, e.g., a portion 708, of the content displayed to a user to be selected. As shown in step 706, the word "content" is selected instead of the letter 'c'. In embodiments, this change in selection may be performed according to a reiteration of flowchart 300 of FIG. 3. Subsequent to the selection in step 706 of portion 708 of the displayed content, it may be determined that the contact instrument still continues to interact with the touch interface.

Continuing this example, a user may further alter the interaction of the contact instrument from orientation 500B to orientation 500C of FIG. 5C and/or from pressure application 600B to pressure application 600C of FIG. 6C. Based on this change, in step 710, a different portion, e.g., a portion 712, of the content displayed to a user is selected. As shown in step 710, instead of the word "content," the phrase "Portions of content are selected," is selected and an indication of the selection is displayed. In embodiments, this change in selection may be performed according to a further reiteration of flowchart 300 of FIG. 3.

As previously noted, after an output showing a selected portion of content is provided to the user, the user may remove the contact instrument from interaction with the touch interface. In embodiments, the selected portion of content may still be shown via a UI enabling the user to perform an action on the portion of the content that was selected, as shown in step 714. For instance, selectable options may be provided to the user via the UI for editing actions, e.g., cut, copy, paste, highlight, bold, underline, etc., for navigation actions, e.g., search, lookup, etc., and/or the like, as would be understood by those of skill in the relevant art(s) having the benefit of this disclosure. In some embodiments, selected portions may be moved within the content after selection via the contact instrument.

It is also contemplated that a change from one orientation or pressure to another one thereof may be followed by an opposite change that returns to the one orientation or pressure from the other. That is, step 706 may be followed by a change that returns to the selection to that shown in step 702. Likewise, step 710 may be followed by a change that returns to the selection to that shown in step 706, or even step 702, according to embodiments. Additionally, referring back to the example for altering contact points in conjunction with orientations and pressures as described above with respect to FIGS. 5A-5C and FIGS. 6A-6C, such an example may also be illustrated in step 706 and step 708. For instance, an orientation and/or pressure for step 706 that causes a word, i.e., "content," to be selected, as shown in portion 708, may be extended by altering the contact point while maintaining the orientation/pressure to select four additional words as shown in step 710 for portion 712.

Figure 8:
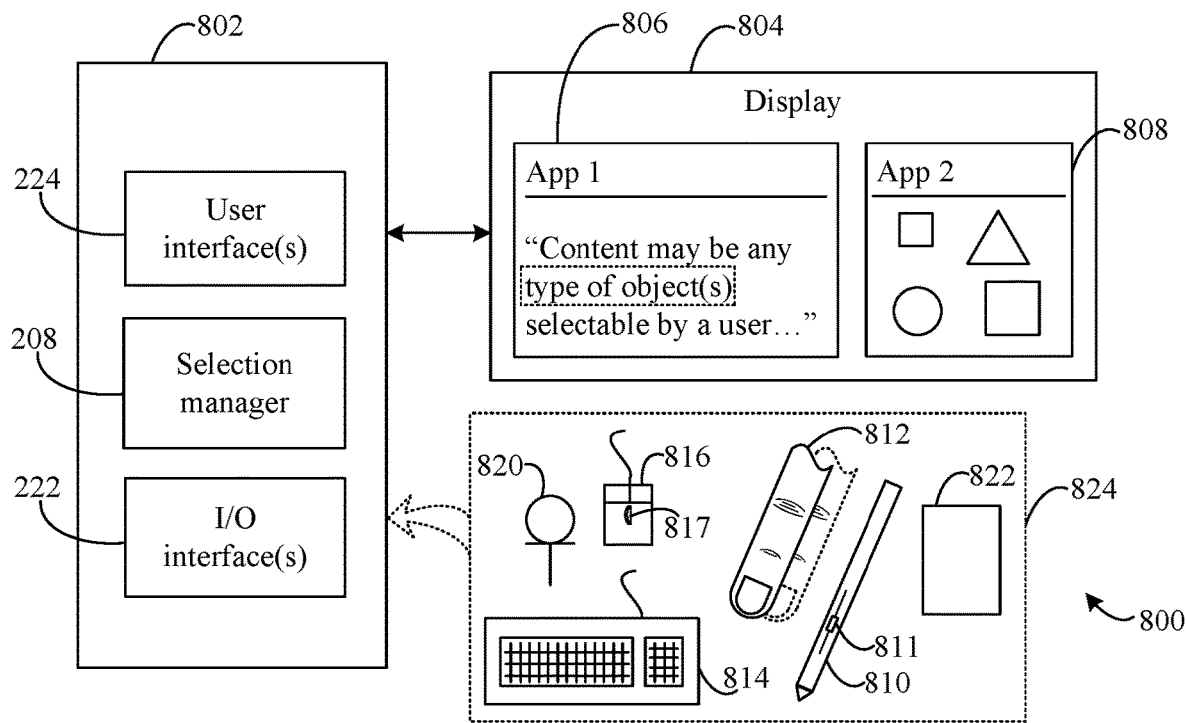
FIG. 8 shows a block diagram of a system for enhancing touch selections for content, in accordance with an example embodiment.
Figure 9:
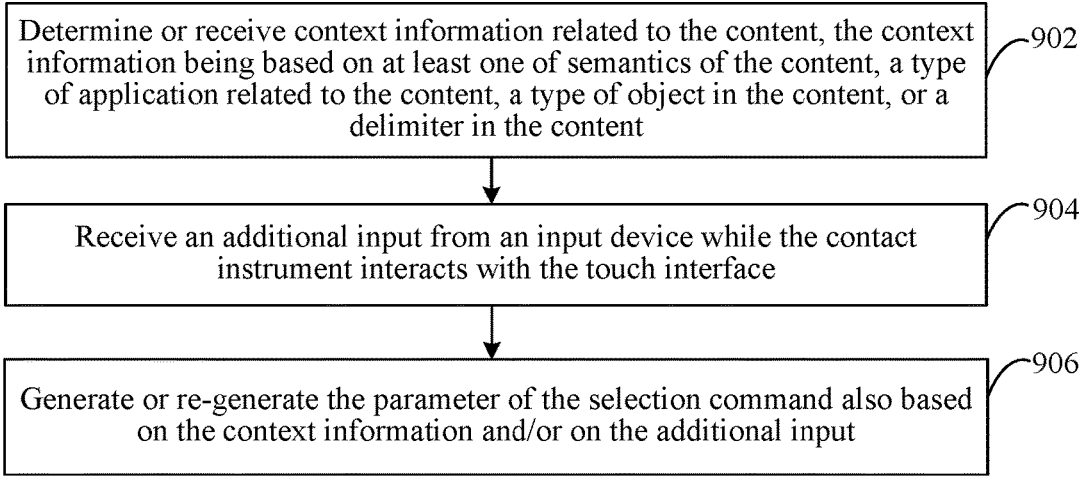
FIG. 9 shows a flowchart for enhancing touch selections for content, in accordance with an example embodiment.

FIG. 8 and FIG. 9 are described as follows. FIG. 8 shows a block diagram of a system 800 for improvements in touch selections for content, according to an example embodiment. System 800 is a further embodiment of system 200 of FIG. 2. FIG. 9 shows a flowchart 900 for improvements in touch selections for content, according to an example embodiment. Flowchart 900 may be an embodiment of flowchart 300 of FIG. 3, and may be performed by system 200 of FIG. 2 and/or system 800 of FIG. 8. Further structural and operational examples will be apparent to persons skilled in the relevant art(s) based on the following description. System 800 is described as follows.

System 800 includes a computing device 802, which may be an embodiment of computing device 202 of FIG. 2, and may be any type of computer or computing device, as mentioned elsewhere herein, or as otherwise known. Computing device 802 may include any components described herein with respect to computing device 202, including selection manager 208, I/O interface(s) 222, and UI(s) 224 as shown. System 800 may also include additional components (not shown for brevity and illustrative clarity) including, but not limited to, components and subcomponents of other devices and/or systems herein, as well as those described below with respect to FIGS. 10 and 11, such as an operating system.

As shown in FIG. 8, system 800 may also include a display 804 configured to display UIs of UI(s) 224, e.g., for software applications such as an application 806 and an application 808. In embodiments, display 804 may be a part of computing device 802 (e.g., as a screen or a touch screen) or may be an external display.

System 800 may also include, or have associated therewith, input devices 824 that corresponds to ones of I/O interface(s) 222. One or more of input devices 824 may be included in computing device 802. Input devices 824 may include, without limitation, a stylus, a pen, or a light pen (stylus "810"), a keyboard 814, a mouse 816, a microphone 820, a touch interface 822, etc. In embodiments, a user's finger(s) 812 may be used as one of input devices 824 (an "organic" input device, versus "non-organic" input devices that include a pen/stylus, a light pen, a keyboard, a mouse, etc.). As shown, stylus 810 may include a button or a slider 811, and mouse 816 may include a wheel 817.

Expanding on the example embodiments described above, input devices 824 may be configured to provide additional inputs as a contact instrument interacts with a touch interface. These additional inputs may be received by selection manager 208. Referring to application 806 and application 808, the context of content for which a portion may be selected can also be received or determined by selection manager 208 to be utilized in determining the size of the portion.

Referring again to FIG. 9, flowchart 900 begins at step 902. In step 902, context information related to the content is determined or received, the context information being based on at least one of semantics of the content, a type of application related to the content, a type of object in the content, or a delimiter in the content. For instance, context manager 212 of selection manager 208 may be configured to determine or receive context information associated with content, as described herein. As illustrated in FIG. 8, application 806 and application 808 each display different types of content: typed text is displayed in application 806 and shapes, figures, or drawings are displayed in application 808. The type of content (e.g., text, images, drawings, etc.) may be an indication of context, and further detailed information surrounding such content may provide additional contextual information. For instance, semantics-based context of textual content may be utilized to determine phrases, proper names, parts of speech, topics, and/or the like. The type of application (e.g., a word processing application, a schematics/drawing application, an email application, a messaging application, a productivity application, an audio application, a video application, etc.) may also be an indication of context. Further, punctuation or other delimiters for content may be used to determine the context thereof. For instance, a spreadsheet program may utilize cells, rows, columns, sheets, etc., as delimiters, while programs involving text may utilize punctuation, line breaks, marked-up text boundaries, and/or the like, and drawing programs may delimit via individual shapes, types of shapes, sizes of shapes, groups, layers, outlines, etc. Programs for consuming or editing audio and/or video content may be delimited by audio values, speech characteristics and/or duration, frames, image values, scene changes, etc.

In step 904, an additional input is received from an input device while the contact instrument interacts with the touch interface. For example, input devices 824 are configured to provide additional inputs while a contact instrument interacts with a touch interface. In one example, a user may continue to press her index finger 812 on touch interface 822 while provided additional input via an additional finger 812, a key of keyboard 814, wheel 817 of mouse 816, or as audio input via microphone 820. That is, while one finger 812 continues to press, the user may swipe or tap with another finger 812, press and/or hold a key of keyboard 814, scroll wheel 817, or speak into microphone 820. Likewise, a stylus, pen, or light pen such as stylus 810 may include buttons or a slider like slider 811 through which additional inputs may be provided. For instance, while maintaining contact with stylus 810 on touch interface 822, the user could adjust slider 811 up and/or down to provide the additional input. Other examples of inputs from input devices 824 described above for touch via finger 812 are also applicable to stylus 810.

The examples above are illustrative in nature only, and are not to be considered limiting. It is contemplated that other forms of additional inputs may be provided by a user as would be understood by persons of skill in the relevant art(s) having the benefit of this disclosure.

In step 906, the parameter of the selection command is generated or re-generated also based on the context information and/or on the additional input. For instance, parameter generator 214 of selection manager 208 may be configured to generate or re-generate parameters for selection commands, as described with respect to flowchart 300 of FIG. 3, based on context information and/or additional inputs.

Additionally, these examples may be used in combination with, or in lieu of, changes in orientation and/or pressure as described herein.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100 of FIG. 1, system 200 of FIG. 2, and system 800 of FIG. 8, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 10:
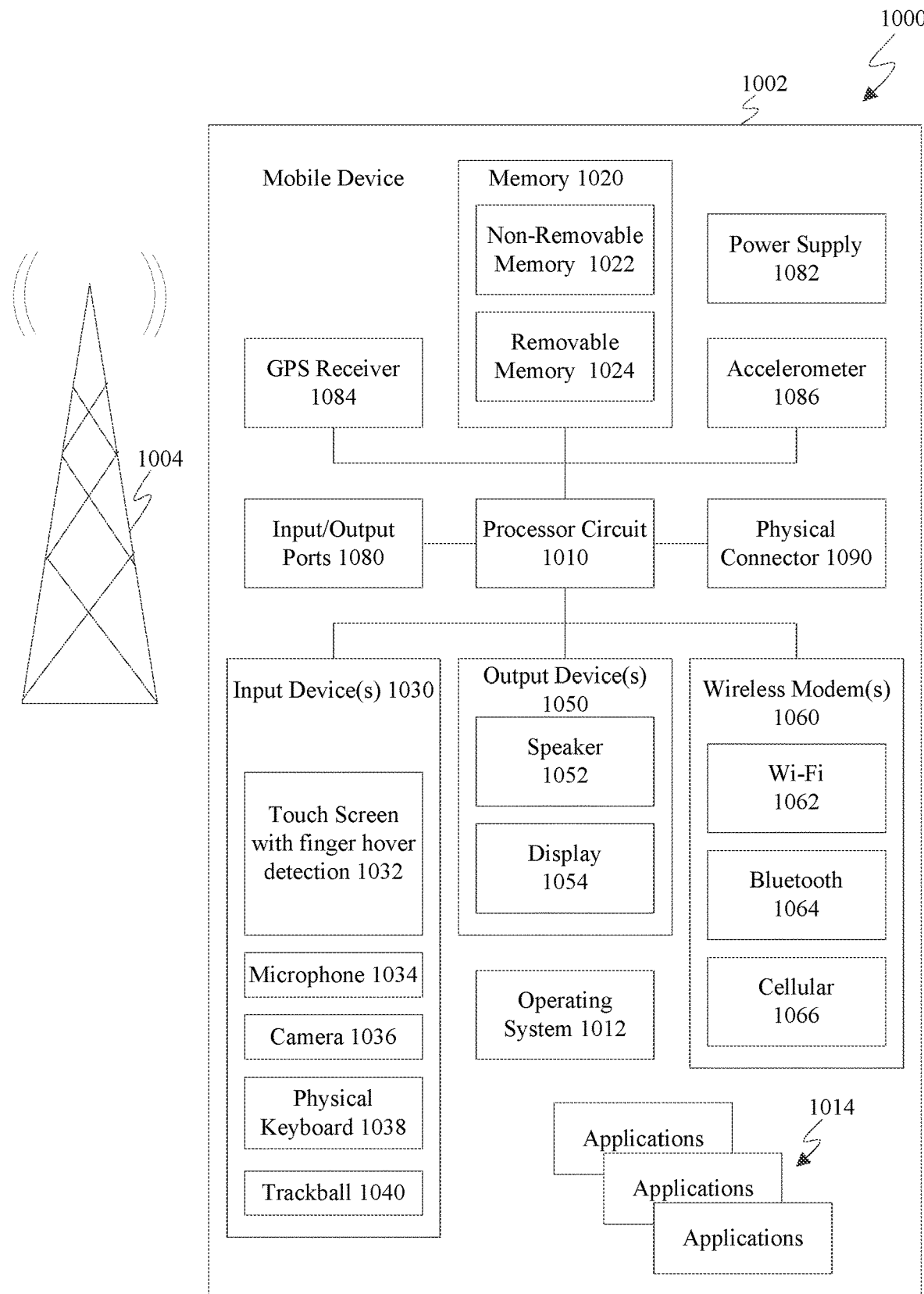
FIG. 10 shows a block diagram of an example mobile device that may be used to implement various example embodiments.

FIG. 10 is a block diagram of an exemplary mobile system 1000 that includes a mobile device 1002 that may implement embodiments described herein. For example, mobile device 1002 may be used to implement any system, client, or device, or components/subcomponents thereof, in the preceding sections. As shown in FIG. 10, mobile device 1002 includes a variety of optional hardware and software components. Any component in mobile device 1002 can communicate with any other component, although not all connections are shown for ease of illustration. Mobile device 1002 can be any of a variety of computing devices (e.g., cell phone, smart phone, handheld computer, Personal Digital Assistant (PDA), etc.) and can allow wireless two-way communications with one or more mobile communications networks 1004, such as a cellular or satellite network, or with a local area or wide area network.

Mobile device 1002 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components of mobile device 1002 and provide support for one or more application programs 1014 (also referred to as "applications" or "apps"). Application programs 1014 may include common mobile computing applications (e.g., e-mail applications, calendars, contact managers, web browsers, messaging applications) and any other computing applications (e.g., word processing applications, mapping applications, media player applications).

Mobile device 1002 can include memory 1020. Memory 1020 can include non-removable memory 1022 and/or removable memory 1024. Non-removable memory 1022 can include RAM, ROM, flash memory, a hard disk, or other well-known memory devices or technologies. Removable memory 1024 can include flash memory or a Subscriber Identity Module (SIM) card, which is well known in GSM communication systems, or other well-known memory devices or technologies, such as "smart cards." Memory 1020 can be used for storing data and/or code for running operating system 1012 and application programs 1014. Example data can include web pages, text, images, sound files, video data, or other data to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing one or more of system 100 of FIG. 1, system 200 of FIG. 2, and system 800 of FIG. 8, along with any components and/or subcomponents thereof, as well as the flowcharts/flow diagrams described herein, including portions thereof, and/or further examples described herein.

Mobile device 1002 can support one or more input devices 1030, such as a touch screen 1032, a microphone 1034, a camera 1036, a physical keyboard 1038 and/or a trackball 1040 and one or more output devices 1050, such as a speaker 1052 and a display 1054. Other possible output devices (not shown) can include piezoelectric or other haptic output devices. Some devices can serve more than one input/output function. For example, touch screen 1032 and display 1054 can be combined in a single input/output device. Input devices 1030 can include a Natural User Interface (NUI).

One or more wireless modems 1060 can be coupled to antenna(s) (not shown) and can support two-way communications between processor 1010 and external devices, as is well understood in the art. Modem 1060 is shown generically and can include a cellular modem 1066 for communicating with the mobile communication network 1004 and/or other radio-based modems (e.g., Bluetooth 1064 and/or Wi-Fi 1062). At least one wireless modem 1060 is typically configured for communication with one or more cellular networks, such as a GSM network for data and voice communications within a single cellular network, between cellular networks, or between the mobile device and a public switched telephone network (PSTN).

Mobile device 1002 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components of mobile device 1002 are not required or all-inclusive, as any components can be deleted and other components can be added as would be recognized by one skilled in the art.

In an embodiment, mobile device 1002 is configured to implement any of the above-described features of flowcharts herein. Computer program logic for performing any of the operations, steps, and/or functions described herein may be stored in memory 1020 and executed by processor 1010.

Figure 11:
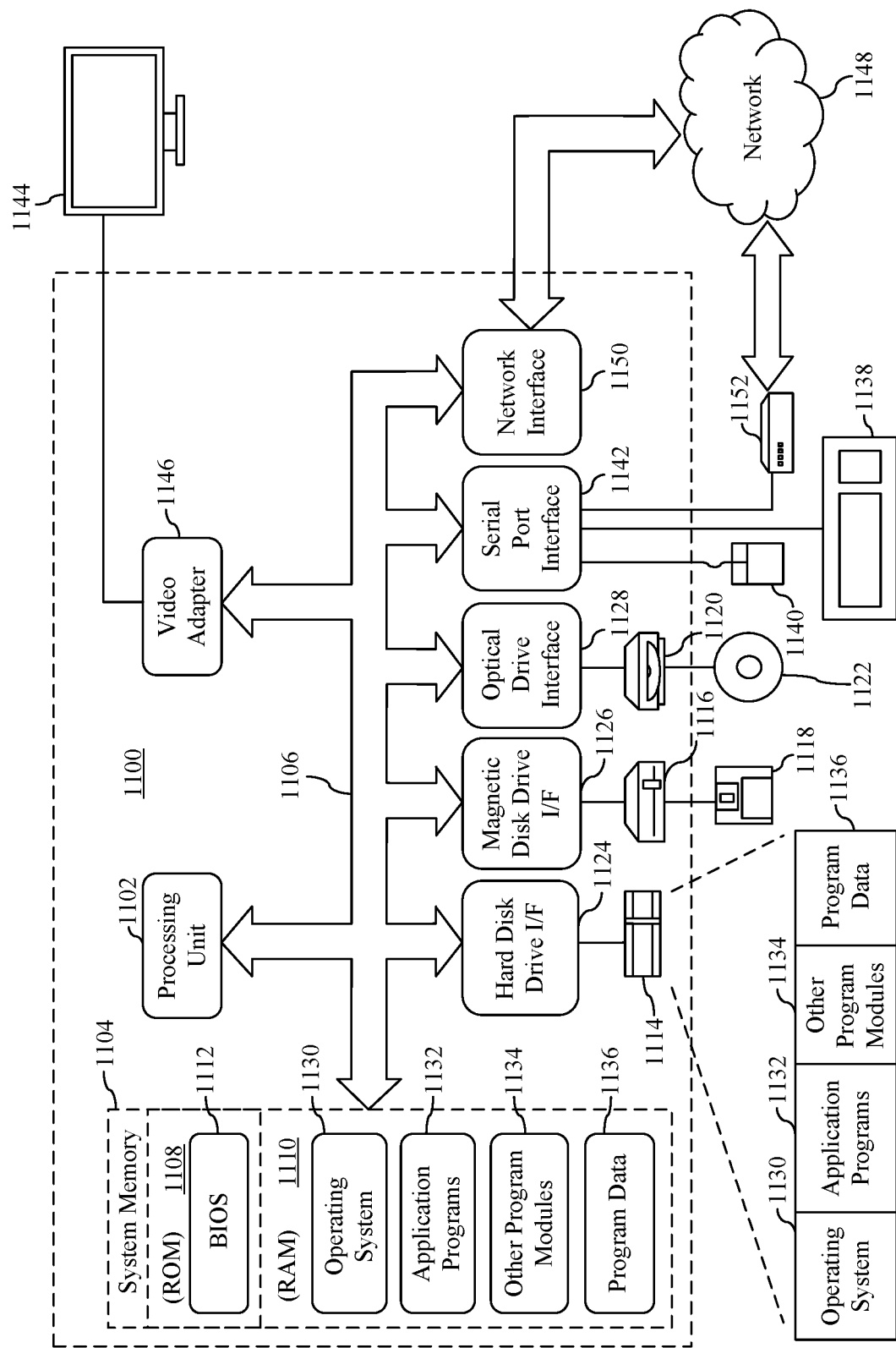
FIG. 11 shows a block diagram of an example computing device that may be used to implement embodiments.

FIG. 11 depicts an exemplary implementation of a computing device 1100 in which embodiments may be implemented. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as system 100 of FIG. 1, system 200 of FIG. 2, and system 800 of FIG. 8, along with any components and/or subcomponents thereof, as well as the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nano-technology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of a pen/stylus and touch inputs via touch interfaces, the embodiments herein are not so limited and may also be applied through other input devices.

Furthermore, the described embodiments do not exist in software implementations for enhancements and improvements to touch selections for content. Conventional solutions lack the granularity for selections described herein, as well as the ability to iterate through different portions of content by changing characteristics of the input device and/or through additional input devices.

Still further, users are enabled to select portions of content, view selections, and change selections in a single interaction, e.g., via a single contact of an instrument with a touch interface that can be manipulated for alterations selections. Thus, the UI functionality and experience are improved. For example, instead of moving the contact instrument to different locations of a touch interface to select portions of content, a single locational interaction is achieved by the described embodiments.

The additional examples and embodiments described in this Section may be applicable to examples disclosed in any other Section or subsection of this disclosure.

A user interface (UI) system is described herein. The UI system may be configured and enabled in various ways to enhance and improve touch selections for content, as described herein. The UI system includes processing system with one or more processors and a memory that stores program code to be executed by the processing system. The program code includes an input detector, a parameter generator, and an output manager. The input detector is configured to receive an input that is associated with content provided via a UI, and that is applied by a contact instrument via a touch interface, and to determine characterization information of the contact instrument relative to the touch interface, the characterization information of the contact instrument being at least one of an orientation or a pressure. The parameter generator is configured to generate a parameter of a selection command based at least in part on the characterization information, the parameter specifying a portion of the content. The output manager is configured to cause the selection command to be executed with the parameter, and to provide an output to the UI based on execution of the selection command, the output including an indication of the portion of the content that was selected.

In an embodiment of the UI system, the characterization information includes a location of interaction between the contact instrument and the touch interface. In the embodiment, the input detector is configured to determine that the contact instrument continues to interact with the touch interface at the location subsequent to the output being provided, and to determine a change in the characterization information of the contact instrument relative to the touch interface. In the embodiment, the parameter generator is configured to re-generate the parameter of the selection command based at least in part on the change in the characterization information, and the output manager is configured to cause the selection command to be re-executed with the re-generated parameter and to provide another output to the UI based on re-execution of the selection command, the other output including an indication of another portion of the content that was selected.

In an embodiment, the program code of UI system further includes a context manager configured to determine context information related to the content, the context information being based on at least one of semantics of the content, a type of application related to the content, a type of object in the content, or a delimiter in the content. In the embodiment, the parameter generator is configured to receive the context information related to the content, and to generate or re-generate the parameter of the selection command also based on the context information.

In an embodiment, the characterization information is a first elevation angle of the orientation, and the change in the characterization information is a change in the first elevation angle to a second elevation angle, the second elevation angle being greater than the first elevation angle and indicating a decrease in the portion of content selected or the second elevation angle being less than the first elevation angle and indicating an increase in the portion of content selected. In an embodiment, the characterization information is a first azimuth angle of the orientation, and the change in the characterization information is a change in the first azimuth angle to a second azimuth angle, the second azimuth angle being greater than the first azimuth angle and indicating a decrease in the portion of content selected or the second azimuth angle being less than the first azimuth angle and indicating an increase in the portion of content selected. In an embodiment, the characterization information is a first pressure, and the change in the characterization information is a change in the first pressure to a second pressure, the second pressure being less than the first pressure and indicating a decrease in the portion of content selected or the second pressure being greater than the first pressure and indicating an increase in the portion of content selected.

In an embodiment, the input detector is configured to determine the change in the characterization information based on the change in the characterization information exceeding a hysteretic change limit, and to maintain the characterization information based on the change in the characterization information not exceeding the hysteretic change limit.

In an embodiment, the content comprises at least one of typed characters, handwritten characters, images, photographs, diagrams, cells in a grid, audio data, video data, a virtual environment, or graphs.

In an embodiment, the touch interface comprises a touch screen configured to enable interaction by the contact instrument and to display the UI.

A computer-implemented method is also described herein. The method may be for enhancing and improving touch selections for content, as described herein. The method includes receiving an input applied by a contact instrument at a location of a touch interface, the input corresponding to content of a software application, and determining a characteristic of the contact instrument with reference to the touch interface. The method also includes generating parameter information associated with a command configured to select a portion of the content based at least in part on the characteristic of the contact instrument, and providing an output to a user interface (UI), the output including an indication of the portion of the content that was selected based on execution of the command.

In an embodiment, the method further includes determining that the contact instrument continues to interact with the touch interface at the location subsequent to the output being provided, and determining a change in the characteristic of the contact instrument relative to the touch interface. In the embodiment, the method includes re-generating the parameter information based at least in part on the change in the characteristic of the contact instrument, and providing another output to the UI based on re-execution of the command with the re-generated parameter information, the other output including an indication of another portion of the content that was selected.

In an embodiment, the method further includes receiving context information related to the content, the context information being based on at least one of semantics of the content, a type of application related to the content, a type of object in the content, or a delimiter in the content, and generating or re-generating the parameter information of the selection command also based on the context information.

In an embodiment, the method further includes performing an action on the other portion of the content that was selected. In the embodiment, the method includes providing, subsequent to performing the action, information associated with at least one of the selection command, the characteristic, the change in the characteristic, the generated parameter information, the re-generated parameter information, the portion that was selected, the other portion of the content that was selected to a machine learning host, and receiving update information for subsequent determinations of characteristics of the contact instrument.

In an embodiment of the method, the characteristic of the contact instrument is at least one of an orientation or a pressure.

In an embodiment of the method, the characteristic of the contact instrument has a default value and at least one other value associated therewith, the default value indicating a default portion amount for selection, and the at least one other value indicating an amount for selection that is different from the default portion amount.

In an embodiment, the method further includes receiving an additional input from an input device while the contact instrument interacts with the touch interface, re-generating the parameter information also based at least in part on the additional input, and providing another output to the UI based on re-execution of the command with the re-generated parameter information, the other output including an indication of another portion of the content that was selected.

A computer-readable storage medium having program instructions recorded thereon that, when executed by a processing device, perform a method, is also described. The method may be for enhancing and improving touch selections for content, as described herein. The method includes receiving an input that indicates a selection related to content and that is applied by a contact instrument via an input interface, and determining characterization information related to interaction of the contact instrument with the input interface, the characterization information indicating a scope for a selection command that is configured to select a portion of the content. The method also includes generating a parameter for the selection command based at least in part on the characterization information, selecting the portion of the content via execution of the selection command having the parameter, and providing an output to a user interface (UI), the output including an indication of the portion of the content that was selected.

In an embodiment, the characterization information includes a location of interaction between the contact instrument and the input interface. In the embodiment, the method further includes determining that the contact instrument continues to interact with the input interface at the location subsequent to the output being provided, and determining a change in the characterization information of the contact instrument relative to the input interface. In the embodiment, the method includes re-generating the parameter of the selection command based at least in part on the change in the characterization information, selecting another portion of the content via re-execution of the command with the re-generated parameter, and providing another output to the UI, the other output including another indication of the other portion of the content that was selected.

In an embodiment, the content is textual characters, and the portion and the other portion are respectively one of a proper name, a phrase, or a grammatical portion of a sentence.

In an embodiment, generating the parameter includes determining context information related to the content, the context information being based on at least one of semantics of the content, a type of application related to the content, a type of object in the content, or a delimiter in the content, and generating the parameter also based at least in part on the context information.

In an embodiment, the characterization information is at least one of an orientation or a pressure.

In an embodiment, the method further includes receiving an additional input from an input device while the contact instrument interacts with the touch interface, and generating the parameter also based at least in part on the additional input.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A user interface (UI) system, comprising:
    a processing system comprising one or more processors; and a memory that stores program code to be executed by the processing system, the program code including:
an input detector configured to:
receive an input that is associated with content provided via a UI, and that is applied by a contact instrument via a touch interface; and
determine characterization information of the contact instrument relative to the touch interface, the characterization information of the contact instrument including an orientation;
a parameter generator configured to:
generate a parameter of a selection command based at least in part on the orientation included in the characterization information, the parameter specifying a portion of the content; and
an output manager configured to:
cause the selection command to be executed with the parameter; and
provide an output to the UI based on execution of the selection command, the output including an indication of the portion of the content that was selected.

2. The UI system of claim 1, wherein the characterization information includes a location of interaction between the contact instrument and the touch interface;
wherein the input detector is configured to:
determine that the contact instrument continues to interact with the touch interface at the location subsequent to the output being provided; and
determine a change in the characterization information of the contact instrument relative to the touch interface;
wherein the parameter generator is configured to:
re-generate the parameter of the selection command based at least in part on the change in the characterization information; and
wherein the output manager is configured to:
cause the selection command to be re-executed with the re-generated parameter; and
provide another output to the UI based on re-execution of the selection command, the other output including an indication of another portion of the content that was selected.

3. The UI system of claim 2, further comprising a context manager configured to:
determine context information related to the content, the context information being based on at least one of semantics of the content, a type of application related to the content, a type of object in the content, or a delimiter in the content; and
wherein the parameter generator is configured to:
receive the context information related to the content; and
generate or re-generate the parameter of the selection command also based on the context information.

4. The UI system of claim 2, wherein the characterization information comprises a first elevation angle of the orientation, and the change in the characterization information comprises a change in the first elevation angle to a second elevation angle,
the second elevation angle being greater than the first elevation angle and indicating a decrease in the portion of content selected, or
the second elevation angle being less than the first elevation angle and indicating an increase in the portion of content selected;

wherein the characterization information comprises a first azimuth angle of the orientation, and the change in the characterization information comprises a change in the first azimuth angle to a second azimuth angle,
the second azimuth angle being greater than the first azimuth angle and indicating a decrease in the portion of content selected, or
the second azimuth angle being less than the first azimuth angle and indicating an increase in the portion of content selected;
or
wherein the characterization information includes a pressure that comprises a first pressure, and the change in the characterization information comprises a change in the first pressure to a second pressure,
the second pressure being less than the first pressure and indicating a decrease in the portion of content selected, or
the second pressure being greater than the first pressure and indicating an increase in the portion of content selected.

5. The UI system of claim 2, wherein the input detector is configured to:
determine the change in the characterization information based on the change in the characterization information exceeding a hysteretic change limit; and
maintain the characterization information based on the change in the characterization information not exceeding the hysteretic change limit.

6. The UI system of claim 1, wherein the content comprises at least one of typed characters, handwritten characters, images, photographs, diagrams, cells in a grid, audio data, video data, a virtual environment, or graphs.

7. The UI system of claim 1, wherein the touch interface comprises a touch screen configured to enable interaction by the contact instrument and to display the UI.

8. A computer-implemented method, comprising:
receiving an input applied by a contact instrument at a location of a touch interface, the input corresponding to content of a software application;
determining a characteristic of the contact instrument that includes an orientation of the contact instrument with reference to the touch interface;
generating parameter information associated with a command configured to select a portion of the content based at least in part on the orientation of the contact instrument that comprises the characteristic of the contact instrument; and
providing an output to a user interface (UI), the output including an indication of the portion of the content that was selected based on execution of the command.

9. The computer-implemented method of claim 8, the method further comprising:
determining that the contact instrument continues to interact with the touch interface at the location subsequent to the output being provided;
determining a change in the characteristic of the contact instrument relative to the touch interface;
re-generating the parameter information based at least in part on the change in the characteristic of the contact instrument; and
providing another output to the UI based on re-execution of the command with the re-generated parameter information, the other output including an indication of another portion of the content that was selected.

10. The computer-implemented method of claim 9, the method further comprising:
- receiving context information related to the content, the context information being based on at least one of semantics of the content, a type of application related to the content, a type of object in the content, or a delimiter in the content;
- wherein at least one of the generating the parameter information or the re-generating the parameter information is further based on the context information.

11. The computer-implemented method of claim 9, the method further comprising:
- performing an action on the other portion of the content that was selected;
- providing, subsequent to performing the action, information associated with at least one of the selection command, the characteristic, the change in the characteristic, the generated parameter information, the re-generated parameter information, the portion that was selected, or the other portion of the content that was selected to a machine learning host; and
- receiving update information for subsequent determinations of characteristics of the contact instrument.

12. The computer-implemented method of claim 8, wherein the characteristic of the contact instrument also includes a pressure of the contact instrument with reference to the touch interface;
- wherein the parameter information associated with the command configured to select the portion of the content is also based at least in part on the pressure of the contact instrument that comprises the characteristic of the contact instrument.

13. The computer-implemented method of claim 8, wherein the characteristic of the contact instrument has a default value and at least one other value associated therewith, the default value indicating a default portion amount for selection, and the at least one other value indicating an amount for selection that is different from the default portion amount.

14. The computer-implemented method of claim 8, further comprising:
- determining that the contact instrument continues to interact with the touch interface at the location subsequent to the output being provided;
- receiving an additional input from an input device while the contact instrument interacts with the touch interface;
- re-generating the parameter information based at least in part on the additional input; and
- providing another output to the UI based on re-execution of the command with the re-generated parameter information, the other output including an indication of another portion of the content that was selected.

15. A computer-readable storage medium having program instructions recorded thereon that, when executed by a processing device, perform a method, the method comprising:
- receiving an input that indicates a selection related to content and that is applied by a contact instrument via an input interface;
- determining characterization information related to interaction of the contact instrument with the input interface, the characterization information including an orientation of the contact instrument and indicating a scope for a selection command that is configured to select a portion of the content;
- generating a parameter for the selection command based at least in part on the orientation of the contact instrument included in the characterization information;
- selecting the portion of the content via execution of the selection command having the parameter; and
- providing an output to a user interface (UI), the output including an indication of the portion of the content that was selected.

16. The computer-readable storage medium of claim 15, wherein the characterization information includes a location of interaction between the contact instrument and the input interface; and
- wherein the method further comprises:
  - determining that the contact instrument continues to interact with the input interface at the location subsequent to the output being provided;
  - determining a change in the characterization information of the contact instrument relative to the input interface;
  - re-generating the parameter of the selection command based at least in part on the change in the characterization information;
  - selecting another portion of the content via re-execution of the command with the re-generated parameter; and
  - providing another output to the UI, the other output including another indication of the other portion of the content that was selected.

17. The computer-readable storage medium of claim 15, wherein the content is textual characters; and
- wherein the portion and the other portion are respectively one of a proper name, a phrase, or a grammatical portion of a sentence.

18. The computer-readable storage medium of claim 15, wherein generating the parameter includes:
- determining context information related to the content, the context information being based on at least one of semantics of the content, a type of application related to the content, a type of object in the content, or a delimiter in the content;
- wherein the generating the parameter is also based at least in part on the context information.

19. The computer-readable storage medium of claim 15, wherein the characterization information also includes a pressure of the contact instrument with reference to the touch interface;
- wherein the parameter for the selection command is also based at least in part on the pressure of the contact instrument that comprises the characteristic of the contact instrument.

20. The computer-readable storage medium of claim 15, wherein the method further comprises:
- receiving an additional input from an input device while the contact instrument interacts with the touch interface;
- wherein the generating the parameter is also based at least in part on the additional input.

* * * * *